April 1, 1969 L. KEDSON 3,436,667

PROTECTION CIRCUIT FOR AN AMPLIFIER SYSTEM

Filed Dec. 8, 1964 Sheet 1 of 3

INVENTOR.
LEONARD KEDSON
BY
Allan Ratner

INVENTOR.
LEONARD KEDSON
BY
Allan Ratner

INVENTOR.
LEONARD KEDSON
BY
Allan Ratner 3,436,667
PROTECTION CIRCUIT FOR AN AMPLIFIER SYSTEM Leonard Kedson, Elberon, N.J., assignor to Electric Associates Inc., Long Branch, N.J., a corporation of New Jersey Filed Dec. 8, 1964, Ser. No. 416,822
Int. Cl. H03f 1/02, 3/04
U.S. Cl. 330—9 2 Claims

ABSTRACT OF THE DISCLOSURE

An output stage for an operational amplifier is provided having voltage and power outputs limited only by the values of the supply voltages applied to the stage including plural groups of semiconducter devices connected such that the polarity of the input to the stage may establish, depending on its magnitude, full conductivity of one or the other group of devices producing a symmetrical output signal of a magnitude approximately equal to the supply voltage or, reduced conductivity of one or the other group of devices producing thereby a symmetrical output whose magnitude is proportional to the input magnitude.

This invention relates to electronic analog computing apparatus and more particularly to a direct coupled amplifier system with a transistorized high voltage output stage having low quiescent current, high power output capability and low distortion.

An analog computer may be used to simulate a dynamic system problem since selected analog computing elements obey laws similar to the fundamental laws which govern such dynamic system. Equations may be written which define a problem and from such equations a program may be defined showing the manner in which the computing elements should be interconnected. The accuracy of the solution of the problem is limited by the accuracy of the computing elements. Since a majority of those elements will usually comprise direct coupled amplifier systems, it is particularly important that such amplifiers have low distortion while allowing a maximum power output.

The signals flowing through the analog computer are slowly varying direct current signals and the direct coupled amplifier systems are used to amplify such signals. Conventional amplifier systems are drift stabilized and are known as operational amplifiers. These amplifier systems comprise a direct coupled amplifier having connections to a virtually driftless A.C. amplifier. The driftless amplifier converts the slowly varying direct current signals to A.C. signals which are amplified, reconverted back to D.C. signals and applied back to the direct current amplifier to provide the stabilization.

In the direct coupled amplifier section of the amplifier system it has heretofore been known in the vacuum tube art to use as an output stage a cascode or totem pole arrangement as described for example in "Design Fundamentals of Analog Computing Components," by R. N. Howe, D. Van Nostrand Co., Inc., 1961. The vacuum tube totem pole output stage comprises an upper and a lower stction with the lower section having an input vacuum tube operating as a conventional amplifier and the upper section having a tube connected as a cathode follower. The cathode follower tube serves as a plate load for the input vacuum tube and the input tube acts as the load impedance for the cathode follower. In this manner the total load for the lower section is maintained constant and the total voltage amplification is approximately equal to the voltage gain of the lower section, while the output impedance of the entire totem pole configuration is maintained relatively low. In addition the totem pole circuit provides low quiescent current drain and allows voltage swings symmetrically between positive and negative voltages.

While the totem pole configuration has been advantageously used in vacuum tube circuits, difficulties arose when attempts were made to obtain its advantages with the use of solid state devices such as transistors. These problems became even more pronounced when a high voltage output was required, e.g., plus or minus 100 volts. Specifically, as a result of the basic differences between voltage controlled vacuum tubes and current controlled transistors it was found that a transistorized circuit provides an insufficient power handling capability and required not only a large quiescent current drain but also large power supply voltages. It was further found that the nonlinearities and the output distortion were much larger than could be tolerated.

In addition, with the use of transistors in the output stage, if an output terminal were inadvertently short circuited to ground, the current through the output transistors would increase substantially without limit. As a result, there would be an almost instantaneous increase beyond the current handling capabilities of such transistors, and the transistors would be destroyed.

Accordingly, an object of the present invention is a transistorized high voltage direct coupled amplifier having an output stage which provides low output impedance, low quiescent current drain, high power output, and symmetrically linear voltage swings between positive and negative voltages, while having extremely low harmonic and cross-over distortion.

Another object of the present invention is a transistor direct coupled amplifier system having a direct coupled amplifier in which the output transistors are rapidly protected against high currents which would ordinarily destroy such transistors.

In carrying out the invention in one form thereof, the transistor direct coupled amplifier has an output stage comprising a lower section and an upper section having some similarities to a totem pole stage. The lower stage includes an input transistor having slowing varying input signals applied to its base and the upper stage includes an emitter follower transistor. The input signals are amplified by the input transistor and applied by way of its collector to both the base and emitter of the emitter follower transistor simultaneously. Specifically, the collector of the input transistor is connected by way of first diode means to the emitter and by way of second diode means to the base of the emitter follower transistor, which operates as a high gain current amplifier. These diode means act as low impedance sources whose impedances are not a function of current flowing through them. Thus, the first diode means helps provide a low quiescent current drain with high power handling capabilities while allowing maximum possible voltage swings substantially limited only by the values of the power supplies. In addition the first diode means improves the cross-over distortion of the output stage. The second diode means provides (1) a base bias for the emitter follower, and (2) a feedback signal which results in an increase in the overall linearity of the output stage and a decrease in the harmonic distortion.

Further, in accordance with the invention there is provided an individual fast acting current limiter for the input transistor and for the emitter follower transistor to protect these transistors from high current flow. Each of these current limiters comprises a substantially small resistor connected in series with the emitter of the transistor it is protecting and a limiter transistor having its emitter and base connected across said small resistor. The collector of the limiter transistor is connected to the input terminal of the transistor it is protecting. When the current flow through the protected transistor increases, the potential drop across the small resistor increases until the limiter transistor is rendered conductive which clamps the base-to-emitter junction of the protected transistor to a potential equal to the collector saturation voltage of the limiter transistor. In this way, the current through the protected transistor is limited to a safe value.

For further objects and advantages of the invention and for a description of its operation, reference is to be had to the following detailed description taken in conjunction with the accompanying drawings in which:

FIG. 1 schematically illustrates a direct coupled amplifier system embodying the invention;

Figure 1:
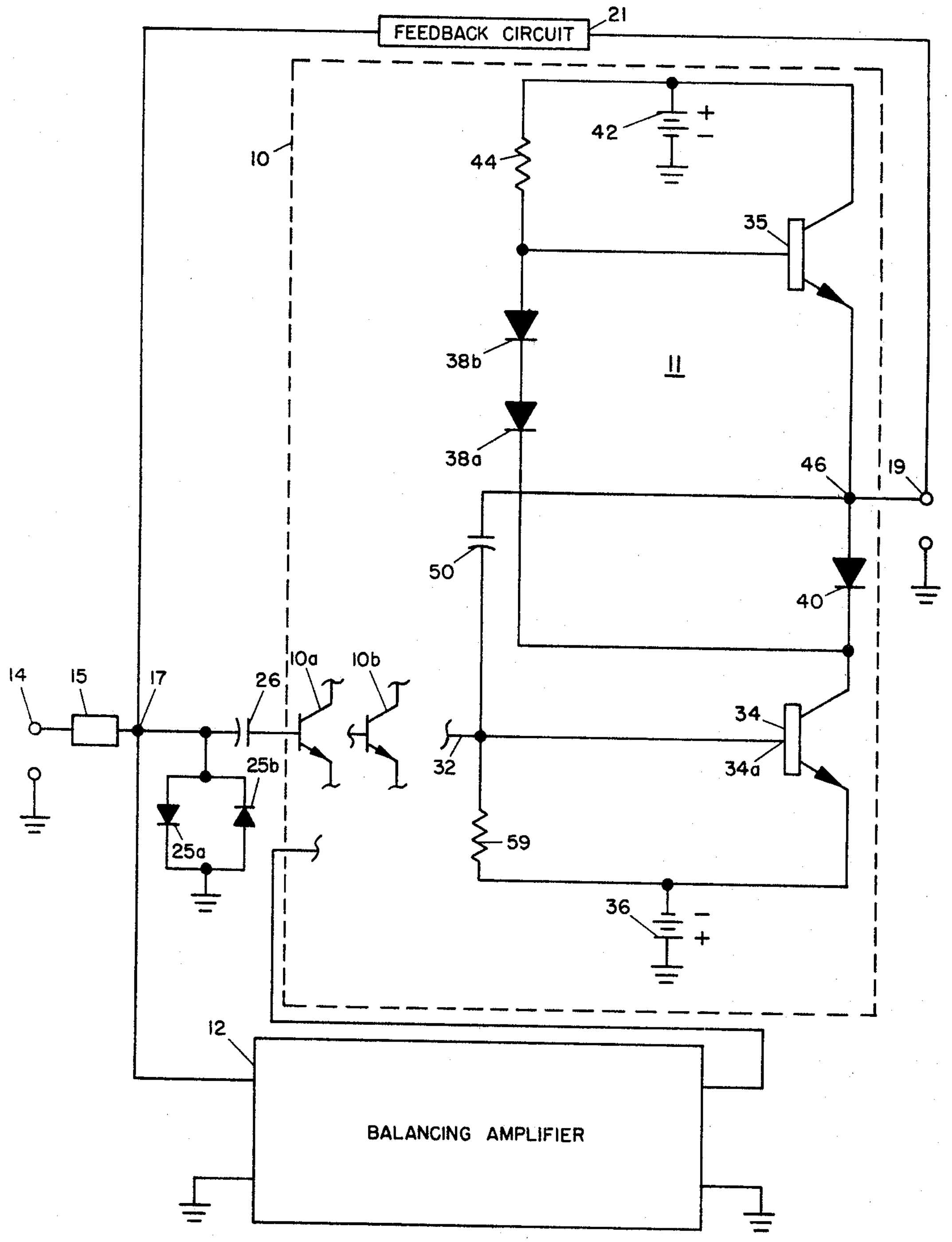
Figure 6:
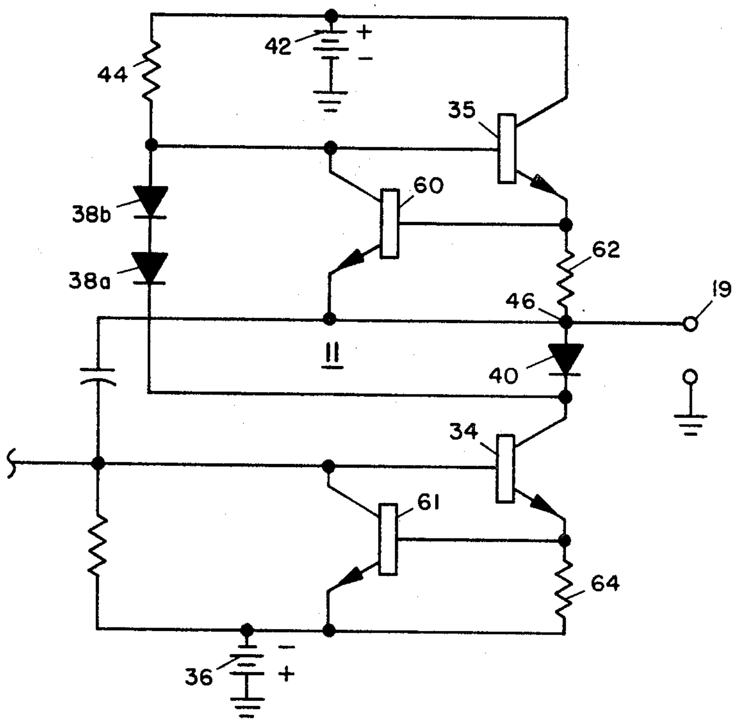

FIG. 6 schematically illustrates a protection circuit to be used in conjunction with the amplifier system of FIG. 1 and a further embodiment of the invention.

Referring now to the amplifier system illustrated in FIG. 1 there is shown within the rectangle 10 a schematic diagram of a direct coupled transistor amplifier including conventional amplifier stages 10*a* and 10*b* and an output stage 11. The rectangle 12 represents a conventional stabilizing amplifier which may include an A.C. amplifier operating in conjunction with a modulator and demodulator. Such stabilizing or balancing amplifiers are well known in the art and are described, for example, in the above cited text "Design Fundamentals of Analog Computer Components" at page 14 et seq.

A slowly varying direct current input signal is applied to input terminals 14, which signal is conducted by way of an input circuit 15 to a summing junction 17. There is further applied to the summing junction 17 a feedback signal from an output terminal 19 of the direct coupled amplifier 10 through a feedback circuit 21. As known in the art, when the amplifier is in a condition of balance the feedback signal very nearly cancels the input signal and the summing junction is maintained at essentially ground potential. Any error signal that is produced at the summing junction is applied by way of direct current blocking capacitor 26 to the base of input transistor 10*a* of amplifier 10.

A pair of diodes 25*a* and 25*b* are parallel connected to each other in an opposite polarity sense between the left hand plate of capacitor 26 and ground. These diodes prevent the buildup of excessive direct current voltage on that capacitor. The summing junction 17 is also connected to an input of stabilizing amplifier 12 which modulates, amplifies and demodulates the signal applied to junction 17. The resultant signal provides a balancing or correction voltage for the direct current amplifier 10 and may be introduced to a selected input circuit of that amplifier to compensate for the effects of drift as described for example in U.S. Patent No. 3,081,435 to M. A. Miller, issued Mar. 12, 1963 and assigned to the same assignee as the present invention.

The slowly varying input signal applied to first stage transistor 10*a* is amplified by that transistor and then applied to an input of second amplifier stage transistor 10*b*. The signal is further amplified in the second stage 10*b* and applied to an input conductor 32 connected to the base 34*a* of the NPN transistor 34 of a third or output stage 11. Transistor 34 comprises the lower or first section of a two-transistor output stage 11 with an NPN transistor 35 comprising an emitter follower upper or second section of that output stage. A frequency shaping capacitor 50 is connected between conductor 32 and a junction 46 and a resistor 59 is connected between conductor 32 and a battery 36. The purpose and operation of the foregoing components are set forth in detail in application Ser. No. 396,956, filed Sept. 16, 1964, and now Patent No. 3,383,610, entitled Compensating System, by the present applicant and assigned to the same assignee as the present invention.

The emitter of transistor 34 is connected to the negative side of the battery 36, the positive side of which is connected to ground. In its quiescent condition, transistor 34 will be almost cut off and its collector will be at approximately zero potential. This zero potential is effectively applied by way of (1) first diode means comprising series-connected diodes 38*a* and 38*b* to the base of transistor 35, and (2) second diode means comprising diode 40 to the emitter of transistor 35. Transistor 35 is almost cut off since its collector is connected to the positive side of a supply battery 42 (the negative side of which is connected to ground) and zero potential is applied to its base and emitter. A junction 46 is connected between the emitter of transistor 35 and the anode of diode 40 and is also at approximately zero potential which potential is applied to an output terminal 19.

In the foregoing quiescent condition, diodes 38*a*, 38*b* and 40 are maintained conductive as a result of the biasing conditions applied to transistors 34 and 35. These biasing conditions cause small currents to flow through these transistors. More particularly a current flow may be traced from the positive side of battery 42 through a resistor 44, diodes 38*b* and 38*a*, the collector, base and emitter of transistor 34 to the negative side of battery 36. An additioinal small current flow may be traced from the positive side of battery 42 through the collector, base, and emitter of transistor 35, junction 46, diode 40, the collector, base and emitter of transistor 34 to the negative side of battery 36.

Figures 2A, 2B, 2C:
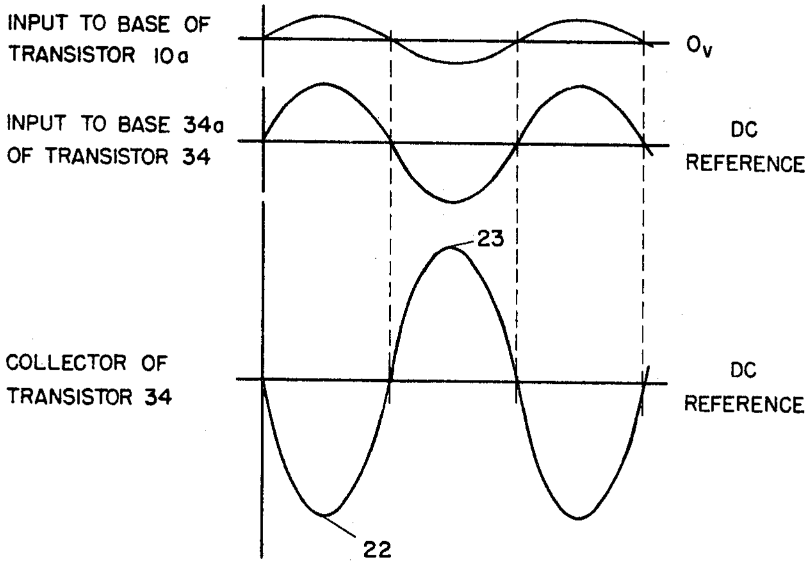
FIGS. 2A–2C are waveforms useful in the explanation of the amplifier system of FIG. 1.

As shown in FIGS. 2A–2B, a slowly varying input signal applied to input terminal 14 is amplified by stages 10*a* and 10*b* and produces an in phase signal at the base of transistor 34. When the signal applied to transistor 34 is positive-going, that transistor is biased to conduct more heavily than in its quiescent condition. Thus, the potential at its collector increases in a negative direction as shown in FIG. 2C which signal is applied by way of diode 40 and diodes 38*a* and 38*b* to the emitter and base respectively of transistor 35. As a result of the negative going potentials being applied to the emitter and base of transistor 35 the conductivity of that transistor decreases from its quiescent condition. This occurs for the reason that the base and emitter of transistor 35 become more negative with respect to its collector which is connected to a positive potential. As a result, transistor 35 draws less and less current.

As shown in FIGS. 2A–2C, the input positive-going signal to transistor 34 may be increased until that transistor is fully conductive. With transistor 34 fully conductive and diode 40 conductive, it will be seen that substantially all of the negative potential of battery 36 appears at junction 46 and at output terminal 19. Thus, substantially all of that negative potential appears at output terminal 19 as a result of the small potential drops across conductive diode 40 and conductive transistor 34. This negative output potential is indicated by reference character 22 in FIG. 2C. It will now be understood that a positive-going input signal produces a corresponding negative-going amplified output signal at terminal 19.

When the input signal to transistor 34 is negative-going, that transistor is biased to become less conductive than in its quiescent condition and approaches its fully cut-off state. As a result, the potential at the collector of transistor 34 increases in a positive-going direction as shown in FIG. 2C. That positive-going potential is applied both to the base and emitter of transistor 35 and also appears at output terminal 19. Thus, the conductivity of transistor 35 is increased from its quiescent condition until it is fully conductive. At this time as indicated by the reference character 23 in FIG. 2C substantially all of the positive potential of battery 42 appears at output terminal 19 except for the small potential drop across fully conductive transistor 35. In this manner, a negative-going input signal produces a corresponding amplified positive-going output signal at the output terminal.

It will now be understood that the output potential at output terminal 19 may swing from approximately the positive potential of battery 42 through zero to approximately the negative potential of battery 36 upon application of a negative-going and a positive-going input signal respectively. In this manner, in accordance with the invention, there is provided in a high voltage direct coupled amplifier an output stage 11 which has symmetrically-linear voltage swings between the positive and negative voltages of the supplies 36 and 42. The output stage further has low output impedance, low quiescent current drain, high output power, and extremely low harmonic and cross-over distortion. That many of the foregoing important advantages occur will best be seen by considering a simplified equivalent circuit of the output stage and then analyzing it in a manner well known in the art.

Figure 3:
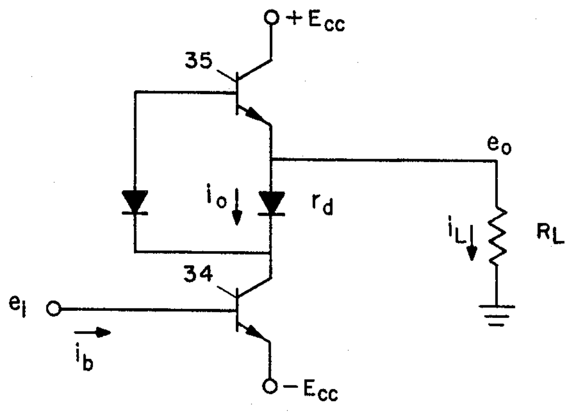
FIGS. 3–5 illustrate for purposes of explanation a simplified equivalent circuit of the output stage of FIG. 1.
Figure 4:
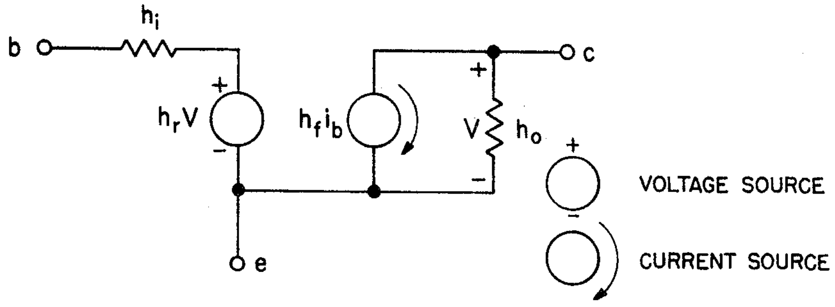

The output stage of FIG. 1 may be simplified for purposes of explanation as shown in FIG. 3. The hybrid equivalent circuit as shown in FIG. 4 may be substituted for each of the transistors 34 and 35 of FIG. 3. For small signals and in normal engineering work the following assumptions may be made:

(1) $h_r \cong 0$ (2) $h_i \cong r\beta$

Figure 5:
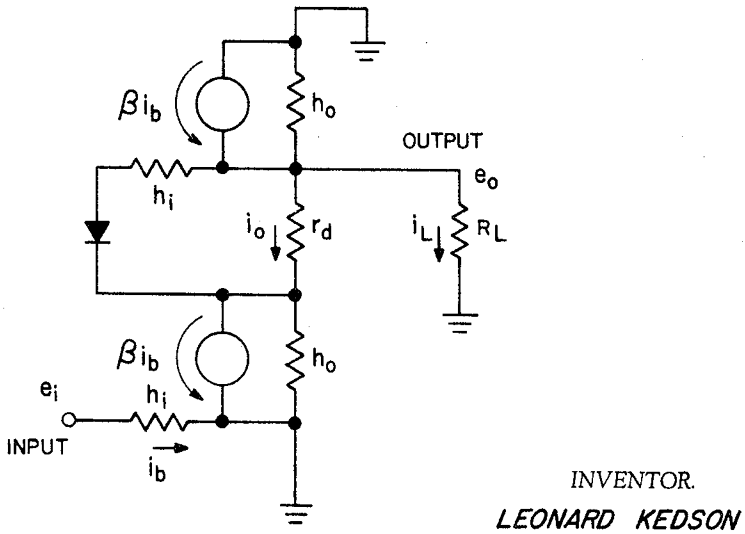

In view of these assumptions the resultant circuit, if we assume that both transistors are similar, is shown in FIG. 5.

In FIG. 5 the terms used are $h_0$=the open circuit output admittance of each transistor,
$g_0=1/h_0$=the open circuit output impedance,
$h_i$=the short circuit input impedance of each transistor,
$\beta$=the short circuit current gain.

Utilizing the above assumptions and simplifications the formula for current gain of output stage 11 may be expressed as:

(3)
$$\frac{i_L}{i_b}=\frac{h_i}{R_L}\left[\frac{\dfrac{\beta}{1+g_0\left(1+\dfrac{g_0}{R_L}\right)}}{\beta+\dfrac{g_0}{r_d}}\right]$$

From FIGS. 3 and 5 it will be understood that $r_d$ represents the resistance of diode 40 in FIG. 1 which in accordance with the invention is negligible. However, in conventional circuits called totem pole circuits, $r_d$ represents a bias resistor of a substantial order of magnitude, as, for example, 1,000 to 5,000 ohms. In accordance with this invention, as a result of the neglibible value of $r_d$ the following advantages are achieved. The expression in the denominator of Equation 3 is (4)
$$1+\frac{g_0\left(1+\dfrac{g_0}{R_L}\right)}{\beta+\dfrac{g_0}{r_d}}$$

With $r_d$ being the substantially very low value of the ON resistance of a diode, Equation 4 has a very low value. As a result, (1) the current gain of Equation 3 is a high value and (2) the maximum load current $i_L$ which can be obtained from the output stage is a high value. With $i_L$ of high value the voltage gain is also high which may be shown by substituting for $i_L$ in a voltage gain equation:

(5)
$$\frac{e_0}{e_i}=\frac{-i_L R_L}{i_b h_i}=\beta\left[1+\frac{(\beta+g_0/r_d)}{g_0(1+g_0/R_L)}\right]$$

In addition to the above, the maximum undistorted voltage which may be obtained from output stage 11 may also be considered to be where (6)
$$e_0(\text{peak})=Ke_{CC}-V_{CE}-i_0r_d$$

K=a constant less than one and depends on the linearity of the transistors,
$V_{CE}$=the collector-to-emitter voltage.

From Equation 6 a substantially low value of $r_d$ such as the ON resistance of a diode results in the peak undistorted output voltage being very high and will be substantially equal to $E_{CC}$. The foregoing results if the transistor is chosen so that K is nearly equal to 1.

In contrast to the above in a conventional totem pole stage, the resistance value of $r_d$ is relatively large so that for the above conditions the peak undistorted output voltage will be much lower. In such conventional circuits in order to obtain the same value of undistorted voltage, the power supplies have been required to have voltage sources of considerably higher magnitudes of potential which produces a much higher power dissipation per stage and a higher quiescent current.

It will also be seen that series-connected diodes 38*a* and 38*b* also provide a biasing potential between the emitter and base of emitter-follower transistor 35. These diodes are required so that the foregoing electrodes are not at the same potential as a result of the substantially small potential drop across these diodes. In this way, harmonic distortion is decreased and overall linearity increased in the output stage which is in contrast to what occurs in prior circuits.

It is to be emphasized at this point, in accordance with the present invention, a diode 40 is utilized in its important location between the collector of transistor 34 and the emitter and the base of transistor 35. In accordance with the invention, this dual coupling provides low impedance paths and allows utilization of transistor 35 as a true high gain current amplifier rather than acting as a relatively constant load as in the operation of the prior art circuits previously described.

Referring now to the further embodiment of the invention of FIG. 6, there is shown output stage 11 of FIG. 1 with various parts of that output stage being identical with those of FIG. 1 and therefore having been identified by corresponding reference characters. There is additionally provided a first current limiting circuit including a transistor 60 and a second current limiting circuit including a transistor 61.

The first current limiting circuit operates to protect transistor 35 from abnormally high current flow which may be caused, for example, if output terminal 19 were inadvertently short circuited to ground. Without such protection the current through transistor 35 would increase without limit and almost instantaneously both the power dissipation ratings and the current handling capabilities of transistor 35 would be exceeded which would result in its destruction.

Transistor 60 has its collector and base connected to the base and emitter respectively of transistor 35. A very small resistor 62 is connected in series circuit with protected transistor 35 and between the emitter of that transistor and junction point 46. In a typical embodiment resistor 62 may have a value of ten ohms. As the current flowing through transistor 35 increases, the potential drop across that resistor 62 increases. The bae and emitter of protecting transistor 60 are connected across resistor 62 and the value of that resistor is chosen in accordance with the magnitude of current that it is desired to limit. When the potential drop across resistor 62 reaches a predetermined potential, transistor 60 is turned ON. The full conduction of transistor 60 is effective to clamp the base-to-emitter junction of transistor 35 to the potential across ON tranistor 60 which is that transistor's collector saturation voltage.

The foregoing clamping action occurs almost instantaneously as the current through transistor 35 reaches its predetermined value and thereby that current is prevented from increasing. In a typical embodiment the foregoing action may take place in one microsecond. In this manner, by utilizing transistor 60 and resistor 62, transistor 35 as well as the other components of output stage 11 are protected from damage which would ordinarily result from the high current flow.

The second protective circuit operates in a manner similar to that described above and the collector and base of transistor 61 are connected to the base and emitter respectively of protected transistor 34. A substantially very small valued resistor 64, as for example, ten ohms, is connected in series with the emitter of transistor 34 and between that emitter and the negative potential of battery 36. The base and emitter of protecting transistor 61 are connected across resistor 64 which is chosen of value so that when the current through transistor 34 reaches a predetermined limiting value the potential drop across resistor 34 is sufficient to turn ON transistor 61. As before, with transistor 61 turned ON, the base-to-emitter junction of transistor 34 is clamped to a potential equal to the collector saturation voltage of transistor 61. In this manner, the current through transistor 34 cannot increase and is thus limited to a safe value.

Now that the principles of the invention have been explained it will be understood that many more modifications may be made without departing from the spirit of the invention. In some of these particular modifications transistors 34 and 35 may be of the PNP type with corresponding reversal of the polarity of batteries 37 and 42 and corresponding reversal of connections of diodes **38*a*, 38*b* and 40. It will also be understood that a combination of NPN and PNP transistors may be utilized in the manner well known in the art. In addition, a collector load resistor may be provided for transistor 34** and connected in series with its collector to provide current limiting for that transistor.

I claim:

1. In a direct current amplifier system the combination of a fast acting current limiter for protecting at least one transistor from damage caused by high current flow which comprises:

a summing junction and an amplifier output terminal,
a multistage direct coupled amplifier connected between said summing junction and said amplifier output terminal,
a feedback circuit connected between said amplifier output terminal and said summing junction,
a stage of said multistage amplifier including at least one amplifier section having a first transistor to be protected, said first transistor having base, emitter and collector electrodes,
resistance means connected to said emitter electrode of said first transistor having a resistance value of substantially small magnitude,
a protecting second transistor having its base and emitter connected across said resistance means to fully turn ON said second transistor when the current flow through said second transistor and said resistance means causes the potential drop across said resistance means to reach a predetermined value, and means connecting the collector of said second transistor to the base of said first transistor whereby, upon said second transistor being fully turned ON, the base-to-emitter junction of said first transistor is damped to the potential across said first transistor thereby preventing said current flow from increasing.

2. In a direct current amplifier system having high output power and being virtually distortionless the combination which comprises:

a summing junction and an amplifier output terminal,
a multistage direct coupled amplifier having an output stage connected to said amplifier output terminal,
a feedback circuit connected between said amplifier output terminal and said summing junction,
said output stage including a first amplifier section having at least a first transistor and a second amplifier section having at least a second transistor,
means connecting an input of said output stage to the base of said first transistor,
at least one first diode connected between a collector of said first transistor and an emitter of said second transistor,
means connecting said first diode to said amplifier output terminal whereby said second transistor operates in an emitter-follower configuration,
at least one second diode connected between said collector of said first transistor and the base of said second transistor whereby said first and second diodes provide dual coupling between said collector of said first transistor and said emitter and base of said second transistor thereby providing low impedance paths to allow said second transistor to operate as a high gain current amplifier,
a separate power supply for said first transistor and for said second transistor of differing polarities connected respectively to the emitter and collector thereof to provide at said amplifier output terminal symmetrically linear output voltage and output power swings,
a resistor of substantially very small resistance value for each of said first and second transistors, means connecting each resistor to its corresponding transistor, and
an additional transistor for each of said resistors having its base and emitter connected across its corresponding resistor, a collector of each said additional transistor being connected to said base of its corresponding one of said first and second transistors, whereby upon the current flow through each said resistor reaching a predetermined limit the potential thereacross is sufficient to turn ON its corresponding additional transistor to effectively clamp the corresponding one of said first and second transistors to the potential across said ON additional transistor.

References Cited

UNITED STATES PATENTS

| | | | |
|---|---|---|---|
| 3,218,566 | 11/1965 | Hayes | 330—9 |
| 3,222,607 | 12/1965 | Patmore | 330—9 |
| 3,237,117 | 2/1966 | Collings et al. | 330—9 |

NATHAN KAUFMAN, *Primary Examiner.*

U.S. Cl. X.R.

330—24, 26